United States Patent
Matsumoto et al.

(10) Patent No.: US 6,678,149 B2
(45) Date of Patent: Jan. 13, 2004

(54) SOLID ELECTROLYTIC CAPACITOR AND METHOD OF MANUFACTURING THE CAPACITOR

(75) Inventors: Koji Matsumoto, Shiga (JP); Masaki Shiragami, Kyoto (JP); Koichi Kojima, Osaka (JP); Tsuyoshi Yoshino, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/352,058

(22) Filed: Jan. 28, 2003

(65) Prior Publication Data

US 2003/0184955 A1 Oct. 2, 2003

(30) Foreign Application Priority Data

| | | | |
|---|---|---|---|
| Mar. 28, 2002 | (JP) | ........................... | 2002-092127 |
| Aug. 5, 2002 | (JP) | ........................... | 2002-227128 |
| Aug. 5, 2002 | (JP) | ........................... | 2002-227135 |
| Aug. 6, 2002 | (JP) | ........................... | 2002-228873 |

(51) Int. Cl.⁷ ................................................ H01G 9/00
(52) U.S. Cl. ................ 361/523; 361/528; 361/508; 361/509; 361/512; 361/518; 29/25.03
(58) Field of Search .................. 361/523, 528, 361/502, 503, 504, 508, 509, 512, 518, 519, 529, 525; 29/25.03

(56) References Cited

U.S. PATENT DOCUMENTS

| | | | |
|---|---|---|---|
| 5,198,967 A | * | 3/1993 | Kuranuki et al. |
| 5,349,496 A | * | 9/1994 | Taniguchi et al. |
| 6,400,554 B1 | * | 6/2002 | Shiraishi et al. |
| 6,400,556 B1 | * | 6/2002 | Masuda et al. |
| 6,510,045 B2 | * | 1/2003 | Mido et al. |
| 6,522,527 B2 | * | 2/2003 | Kojima et al. |

* cited by examiner

*Primary Examiner*—Anthony Dinkins
*Assistant Examiner*—Nguyen T Ha
(74) *Attorney, Agent, or Firm*—Wenderoth, Lind & Ponack, L.L.P.

(57) ABSTRACT

A capacitor element includes an anode body made of valve metal having a substantially-rectangular shape and having positive and negative portions separated in a first direction parallel to a short side of the rectangular shape, a dielectric oxide layer over the negative portion, a solid electrolyte layer over the dielectric oxide layer, and a negative electrode layer over the solid electrolyte layer. A capacitor includes at least one of the capacitor element, an insulating enclosure encapsulating the at least one capacitor element, an external positive electrode provided on an exterior of the insulating enclosure at a first long side of the rectangular shape and extending in a second direction parallel to the long sides, the external positive electrode being connected to the positive portion of the at least one capacitor element, and an external negative electrode provided on an exterior of the insulating enclosure at a second long side of the rectangular shape and extending in the second direction, the external negative electrode being connected to the negative electrode layer of the at least one capacitor element.

51 Claims, 14 Drawing Sheets

実施の形態 1    実施の形態 3         実施の形態 9
　　実施の形態 2    実施の形態 6,7,8 ents having anode bodies made of tantalum powder connected to the lead terminal has a large ESL, and a capacitor of Al-foil-lead-terminal type having the anode bodies made of aluminum foil connected to the lead terminal has a small ESL. A capacitor of Al-foil-edge-contact type including the capacitor element having the anode body made of aluminum foil contacting at its edge has the smallest ESL.

SOLID ELECTROLYTIC CAPACITOR AND METHOD OF MANUFACTURING THE CAPACITOR

FIELD OF THE INVENTION

The present invention relates to a solid electrolytic capacitor used in various electronic apparatuses and a method of manufacturing the capacitor.

BACKGROUND OF THE INVENTION

It has recently been desired that electronic capacitors installed around CPUs in personal computers have large capacitances and small overall dimensions. In addition, it is desired that the capacitors have not only a small equivalent series resistance (ESR) but also a small equivalent series inductance (ESL) so as to provide an improved transient response at high frequencies.

FIG. 21 is a perspective view of a conventional solid electrolytic capacitor, and FIG. 22 is a cross sectional view of the capacitor. FIG. 23 is a perspective view of a capacitor element in the conventional solid electrolytic capacitor. The conventional solid electrolytic capacitor 55 includes plural capacitor elements 56.

As shown in FIG. 23, the capacitor element 56 includes a rectangular anode body having a long side L and a short side W made of either an aluminum foil having its surface area increased by etching or a baked block of valve metal powder (e.g. tantalum or niobium) with a positive electrode lead (not shown) embedded therein (not shown). The anode body includes a positive portion 58 and a negative portion 59 separated by a resist 57 in a direction along the long side L. The negative portion is immersed in electrolyte liquid for anode-oxidization (anodizing), thus being coated with a dielectric oxide layer (not shown) on its surface. Then, a solid electrolyte layer (not shown) and a negative electrode layer 60 are developed in this order on the dielectric oxide layer.

The capacitor elements 56 are joined at both short sides W to one another with a positive electrode lead terminal 61 and a negative electrode lead terminal 62, respectively. The capacitor elements 56 are then encapsulated in a resin package 63 so that a positive electrode terminal 61a and a negative electrode terminal 62a respectively provided to the positive electrode lead terminal 61 and the negative electrode lead terminal 62 are exposed to the outside of the resin package 63. Thus, the capacitor 55 includes a positive electrode terminal 61a and a negative electrode terminal 62a on respective short sides W thereof disposed opposite to each other. This arrangement allows the capacitor 55 to have a large capacitance and small overall dimensions and to be surface-mounted.

FIG. 24 illustrates measurements of the ESL of the conventional solid electrolytic capacitor. The longer the capacitor, the higher the ESL becomes. Under the condition that the length of the capacitor is unchanged, a capacitor of Ta-pellet-lead-terminal type including the capacitor ele- The conventional solid electrolytic capacitor shown in FIGS. 21 to 23 includes the capacitor element 56 having the positive portion 58 and the negative portion 60 on the rectangular anode body of aluminum foil electrically connected to the positive electrode lead terminal 61 and the negative electrode lead terminal 62, respectively, provided along the short sides W of its rectangular shape. This arrangement reduces the ESR and the overall size and increases the capacitance. However, as apparent from FIG. 24, the conventional solid electrolytic capacitor fails to improve the ESL.

SUMMARY OF THE INVENTION

In a preferred embodiment, a capacitor element includes an anode body made of valve metal and having a substantially-rectangular shape. The capacitor element has positive and negative portions separated in a first direction parallel to a short side of the rectangular shape, a dielectric oxide layer over the negative electrode, a solid electrolyte layer over the dielectric oxide layer, and a negative electrode layer over the solid electrolyte layer.

A capacitor includes at least one of the capacitor elements, and preferably a plurality of the capacitor elements stacked one on another, an insulating enclosure encapsulating the capacitor elements, an external positive electrode provided on an exterior of the insulating enclosure at a first long side of the rectangular shape and extending in a second direction parallel to the long side, the external positive electrode being connected to the positive portion of the capacitor elements, and an external negative electrode provided on an exterior of the insulating enclosure at a second long side of the rectangular shape and extending in the second direction, the external negative electrode being connected to the negative electrode layer of the capacitor elements.

The solid electrolytic capacitor has reduced ESR and ESL while having a small overall size and a large capacitance.

DESCRIPTION OF THE PREFERRED EMBODIMENTS (Embodiment 1)

Figure 1:
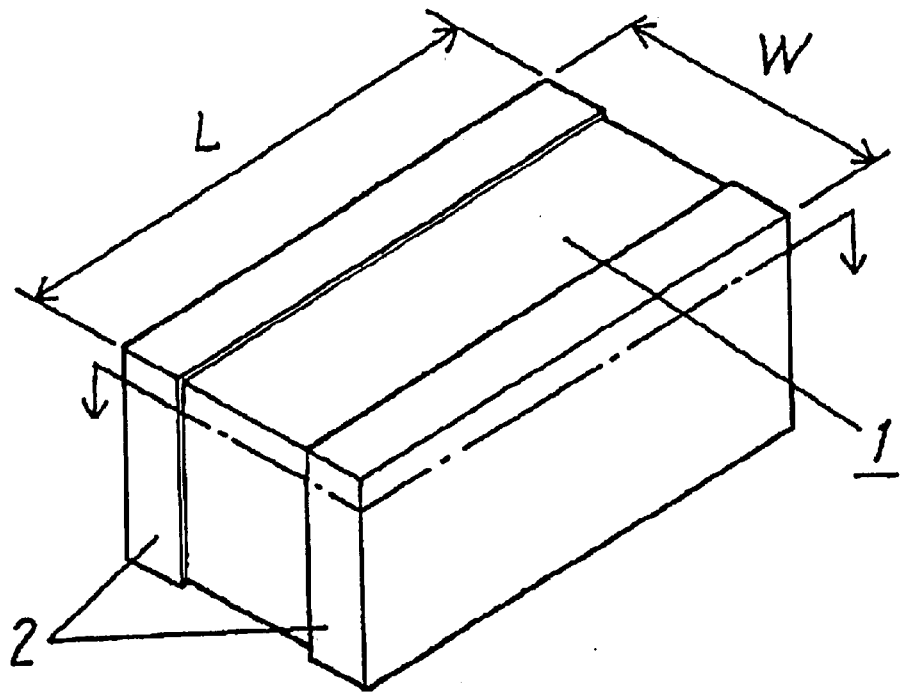
FIG. 1 is a perspective view of a solid electrolytic capacitor according to Embodiment 1 of the present invention.
Figure 2:
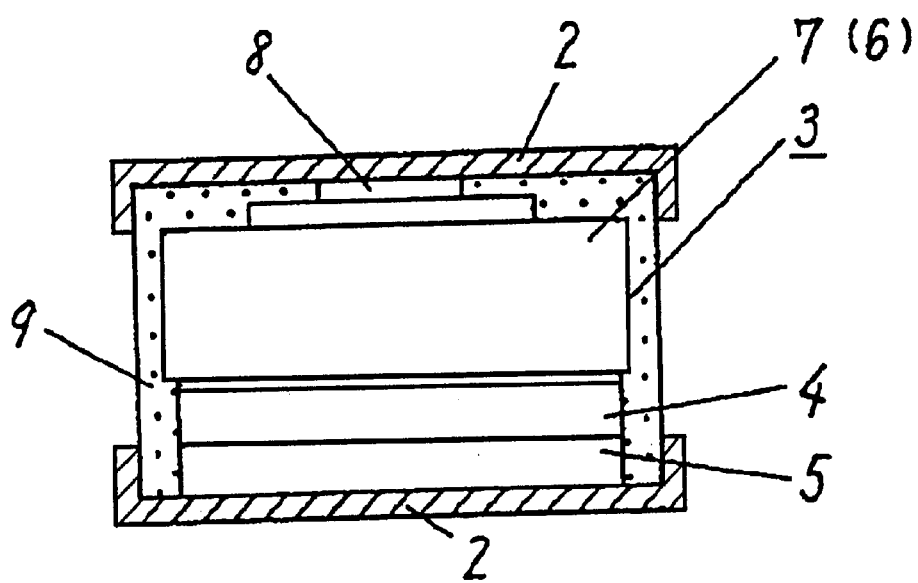
FIG. 2 is a cross sectional view of the solid electrolytic capacitor at a line 2—2 of FIG. 1.
Figure 3:
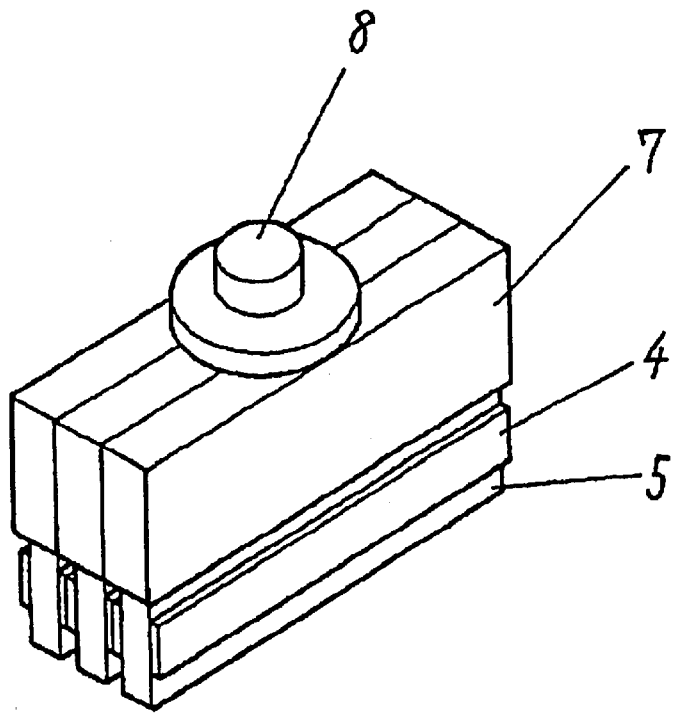
FIG. 3 is a perspective view of the solid electrolytic capacitor before a molding process according to Embodiment 1.
Figure 4:
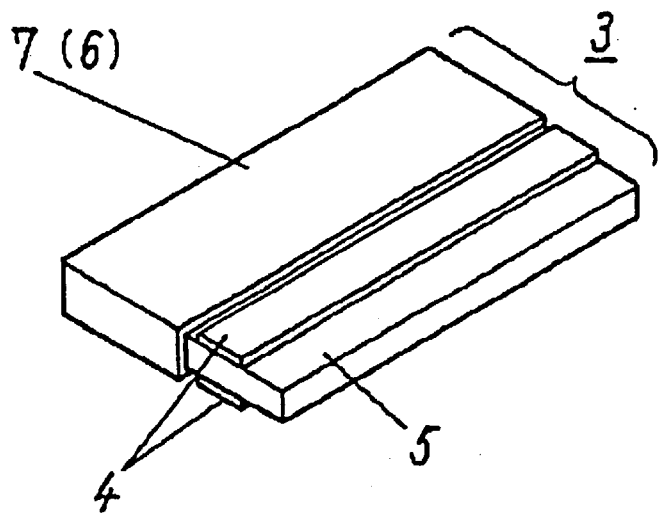
FIG. 4 is a perspective view of a capacitor element in the solid electrolytic capacitor according to Embodiment 1.

FIG. 1 is a perspective view of a solid electrolytic capacitor 1 according to Embodiment 1 of the present invention. FIG. 2 is a cross sectional view of the capacitor 1 at a line 2—2 of FIG. 2. FIG. 3 is a perspective view of the capacitor 1 before a molding process. FIG. 4 is a perspective view of a capacitor element 3 in the capacitor 1.

The solid electrolytic capacitor 1 has a rectangular shape defined by a long side L and a short side W, and includes external electrodes 2 on respective long sides L facing each other. The distance between the external electrodes 2 is shorter than the long side L.

FIG. 4 illustrates the capacitor element 3 in the solid electrolytic capacitor 1. The capacitor element 3 includes a rectangular anode body made of valve metal foil, such as aluminum, which is separated by an insulating resist 4 in a direction of the short side W into a positive portion 5 and a negative portion 6. The negative portion 6 is coated with a dielectric oxide layer and a solid electrolyte layer (not shown). Then, a negative electrode layer 7 made of carbon or silver paste is provided. The valve metal of the anode body can include aluminum, tantalum or niobium, or an alloy of one or more of these.

The solid electrolyte layer is made of conductive polymer having a large electric conductivity, and thus the capacitor has a small ESR.

As shown in FIG. 3, three of the capacitor elements 3 are stacked. However, number of the capacitor elements 3 may be other than three. The negative electrode layers 7 are electrically connected along the long side L to one another with a rivet 8 made of material having a small resistivity, such as silver. The capacitor elements 3 are then encapsulated with an insulating resin 9, as shown in FIG. 2. The external electrodes 2 are then electrically connected (e.g., via direct contact) to the rivet 8 and the positive portions 5 of the capacitor elements 3, respectively. Thus, the solid electrolytic capacitor 1 of Embodiment 1 is provided.

The external electrodes 2 connected to the positive portion and the negative portion of each capacitor element thus function as an external positive electrode and an external negative electrode, respectively.

Figure 5A:
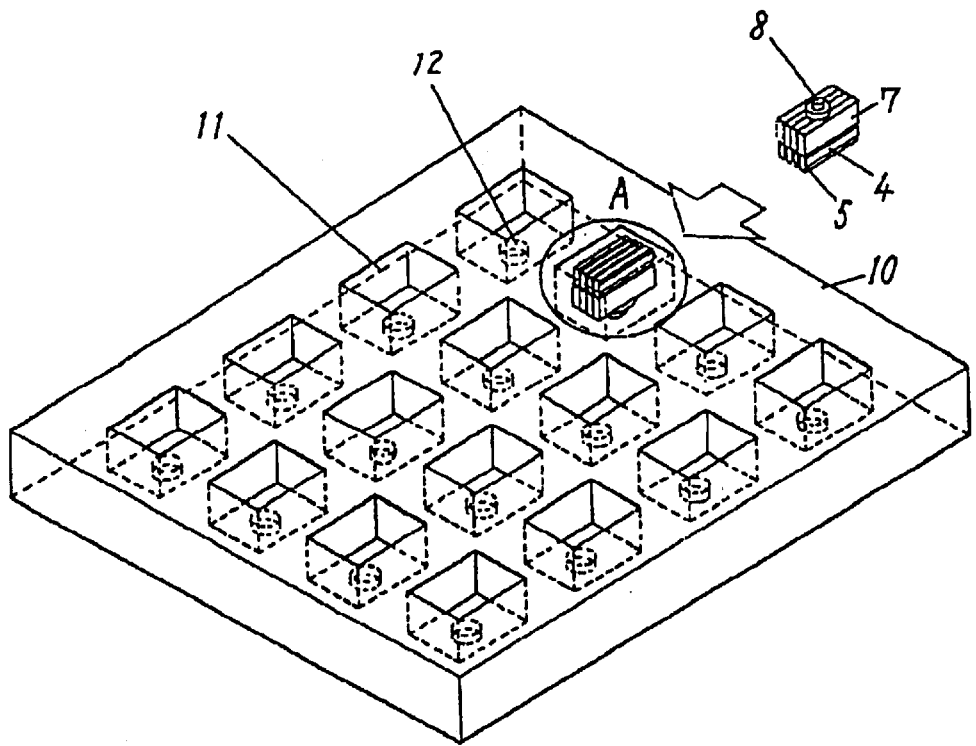
FIG. 5A is a perspective view of a molding die for the solid electrolytic capacitor according to Embodiment 1.
Figure 5B:
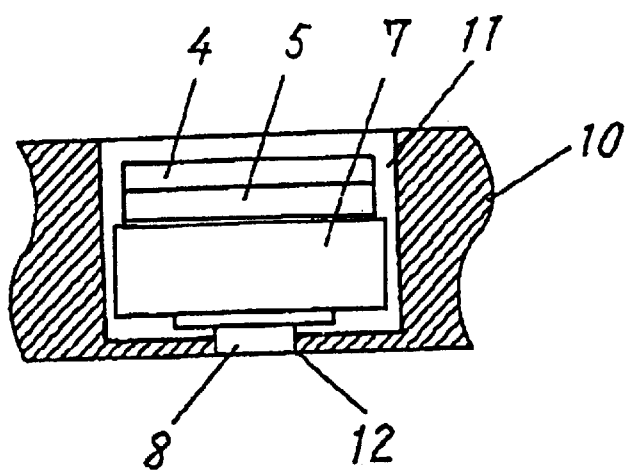
FIG. 5B is an enlarged cross sectional view of the molding die for the solid electrolytic capacitor according to Embodiment 1.

FIG. 5A is a perspective view of the molding process for encapsulating the capacitor elements 3 and the rivet 8 with the insulating resin 9. FIG. 5B is an enlarged cross sectional view of part A of FIG. 5A. A molding die 10 has an array of cavities 11 each having the dimensions of the solid electrolytic capacitor 1 to be formed. An aperture 12 is provided at the bottom of each cavity 11, and the rivets 8 are fitted in the apertures 12 to securely hold the capacitor elements 3. While the capacitor elements 3 are held, the cavities 11 are filled with the insulating resin 9 for encapsulating each of the capacitor elements 3.

The external electrodes may be implemented by plated layers. This implementation reduces both the ESR and an ESL.

Figure 20:
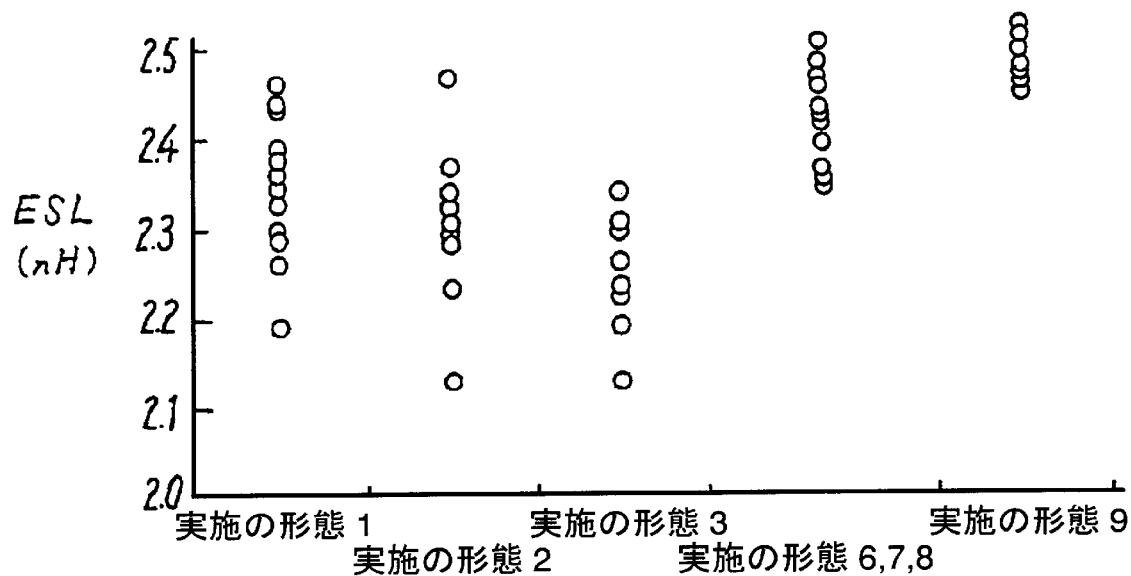
FIG. 20 is a profile of ESL characteristics of the solid electrolytic capacitors of the embodiments.
Figure 21:
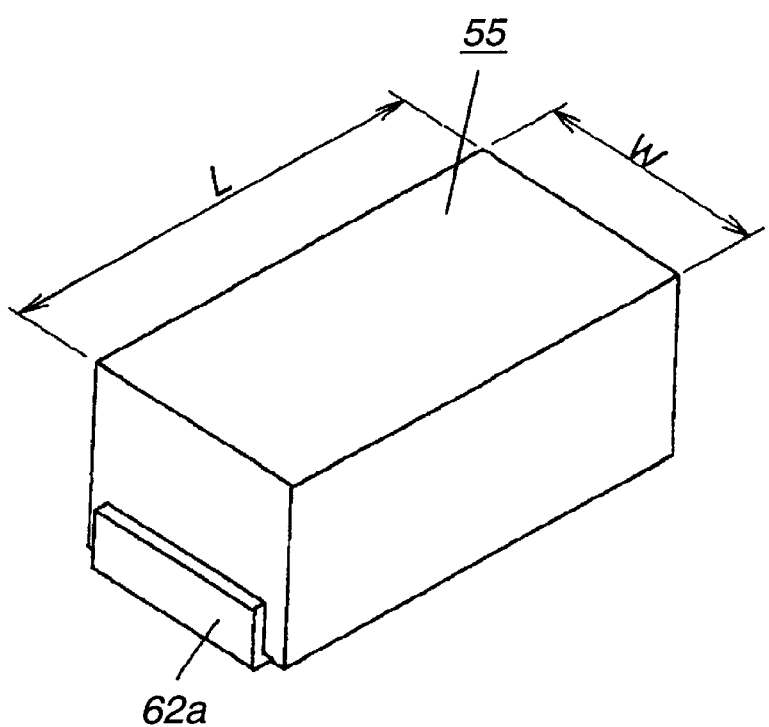
FIG. 21 is a perspective view of a conventional solid electrolytic capacitor.
Figure 22:
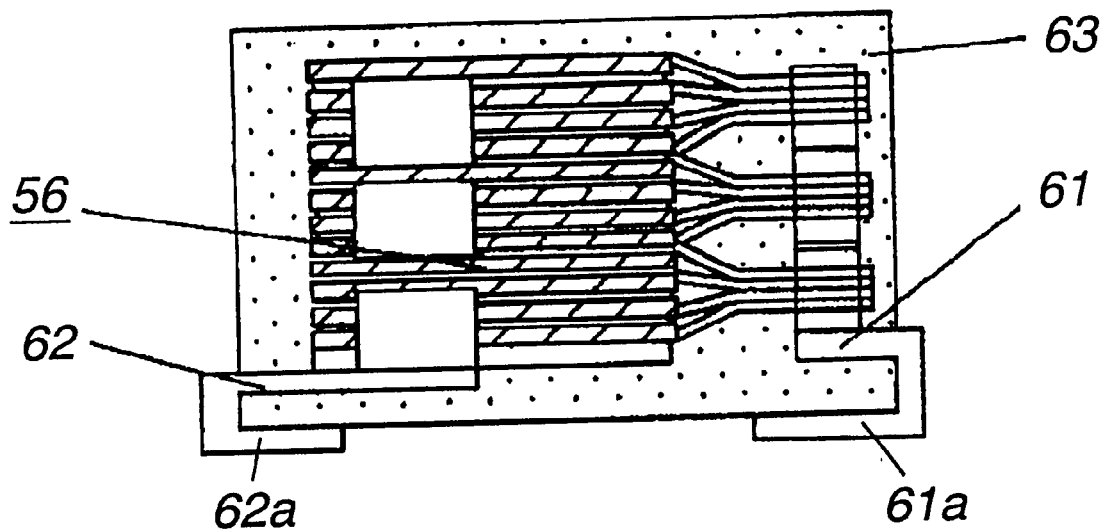
FIG. 22 is a cross sectional view of the conventional solid electrolytic capacitor.
Figure 23:
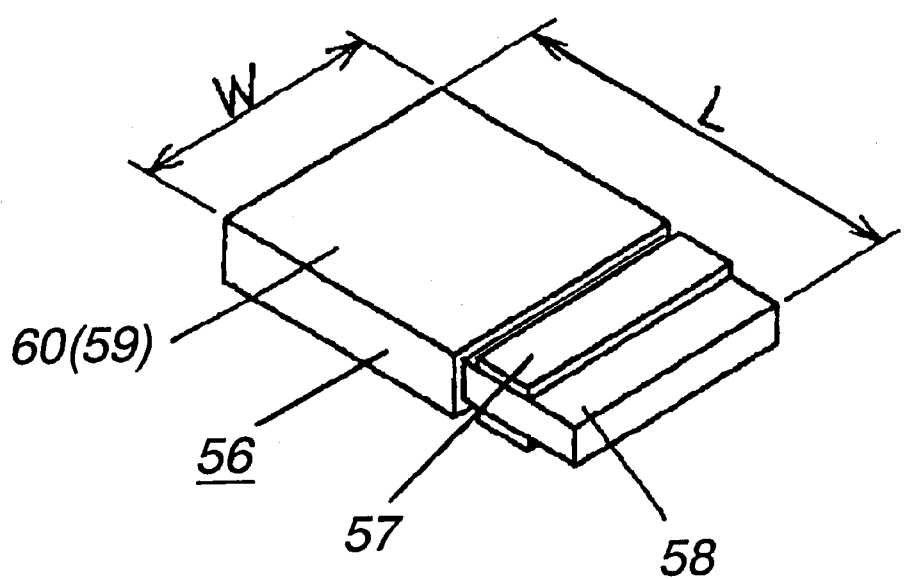
FIG. 23 is a perspective view of a capacitor element in the conventional solid electrolytic capacitor.
Figure 24:
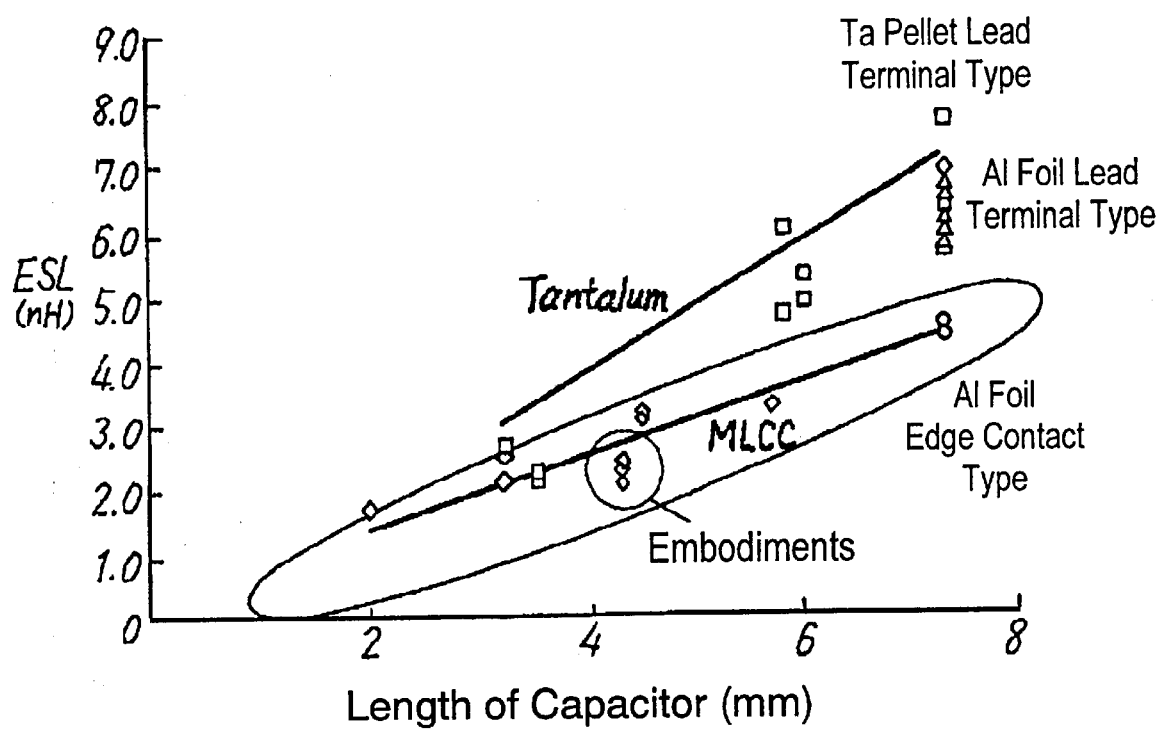
FIG. 24 is a profile of ESL characteristics of the conventional solid electrolytic capacitor.

In the solid electrolytic capacitor of Embodiment 1, the distance between the external electrodes 2 largely affecting the ESL is shorter than the long side L. Since redundant electrode leads of lead terminals in the conventional capacitor are eliminated, the solid electrolytic capacitor of Embodiment 1 has a significantly-reduced ESL. More specifically, the solid electrolytic capacitor of the embodiment has a small overall size and a large capacitance while having significantly-reduced ESR and ESL. As apparent from FIG. 20, the solid electrolytic capacitor of Embodiment 1 has the ESL stabilized around 2.35 nH, which is much smaller than that of the conventional capacitor.

The ESL was measured with the impedance analyzer 4294A and the test fixture 16044A manufactured by Agilent technologies in a standard measuring method utilizing an open-short calibration described in a manual of the impedance analyzer and the test fixture. The ESL may be measured as different values according to a measuring method, especially to a calibration.

The anode body of the capacitor element 3 of Embodiment 1 is implemented by a valve metal foil having a rough surface. The valve metal foil of the anode body may be coated with a baked layer of valve metal powder.

The rivet 8 for electrically joining the negative electrode layers 7 to one of the external electrodes 2 has a cylindrical shape with a step. The rivet 8 may have a sided column shape. It is however noted that the air-tightness may decline if the interface between the rivet 8 and the external electrode 2 has an excessively-large area.

(Embodiment 2)

Figure 6:
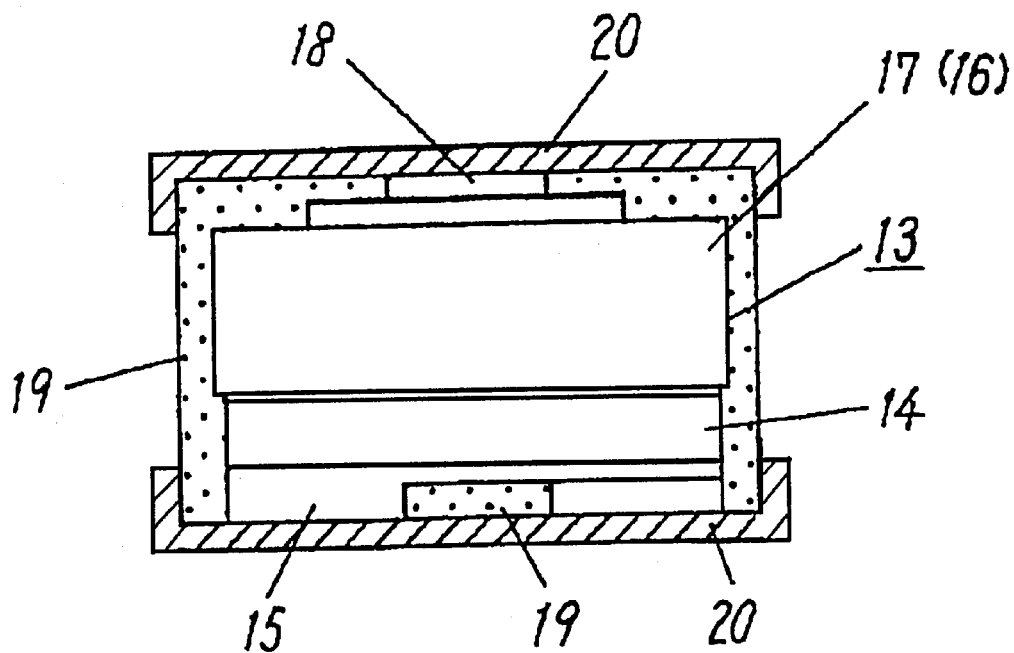
FIG. 6 is a cross sectional view of a solid electrolytic capacitor according to Embodiment 2 of the invention.
Figure 7:
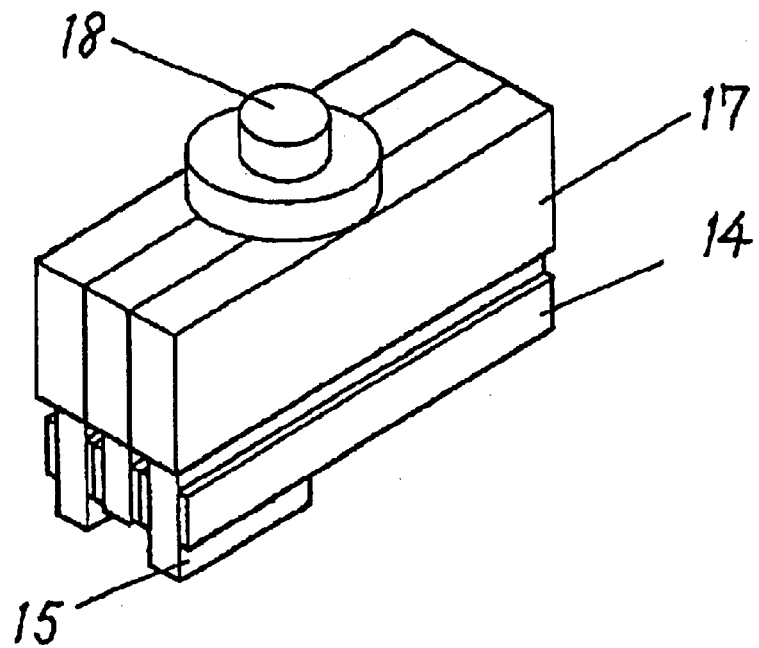
FIG. 7 is a perspective view of the solid electrolytic capacitor before a molding process according to Embodiment 2.
Figure 8:
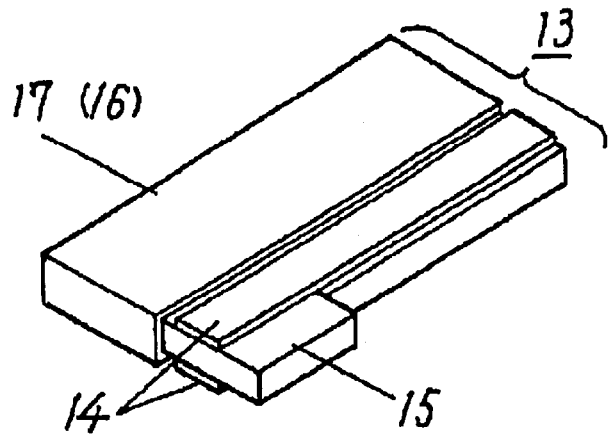
FIG. 8 is a perspective view of a capacitor element in the solid electrolytic capacitor according to Embodiment 2.

FIG. 6 is a cross sectional view of a solid electrolytic capacitor according to Embodiment 2 of the present invention. FIG. 7 is a perspective view of the solid electrolytic capacitor before a molding process. FIG. 8 is a perspective view of a capacitor element 13 of the capacitor. This embodiment is generally the same as the above embodiment except as otherwise described below.

As shown in FIG. 8, an anode body made of a rectangular valve metal foil, such as aluminum, is separated in a direction of a short side W at an insulating resist 14 into a positive portion 15 and a negative portion 16. The negative portion 16 is coated with a dielectric oxide layer and a solid electrolyte layer (not shown) and then is coated with a negative electrode layer 17 of carbon or silver paste. Thus, the capacitor element 13 is provided.

The solid electrolyte layer is made of electrically conductive polymer having a large electrical conductivity, and thus the capacitor has a reduced ESR.

The positive portion 15 has a cutout of substantially ⅔ of its length along the long side L. The capacitor elements 13 are stacked so that the positive portions of adjacent elements do not overlap. The respective negative electrode layers 17 of the capacitor elements 13 are electrically connected to one another with a rivet 18 which is made of material having a small resistivity, such as silver, along the long side L. Then, they are encapsulated with an insulating resin 19. The rivet 18 and the positive electrodes 15 of the capacitor elements 13 are connected to external electrodes 20 along the long sides L, respectively. The distance between the external electrodes 20 is shorter than the long side L.

The external electrodes 20 connected with the positive portion and the negative portion of each capacitor element hence function as an external positive electrode and an external negative electrode, respectively.

The external electrodes may be implemented by plating layers. This implementation reduces both the ESR and an ESL.

The solid electrolytic capacitor of Embodiment 2 includes the capacitor elements 13 stacked alternately in opposite directions, so that the cutouts of the positive portions 15 of adjacent elements do not be overlap. Since the cut portions are fully filled with the insulating resin 19, the solid electrolytic capacitor has excellent air tightness. As apparent from FIG. 20, the solid electrolytic capacitor of Embodiment 2 has the ESL stabilized around 2.30 nH, which is much lower than that of the conventional capacitor.

(Embodiment 3)

Figure 9:
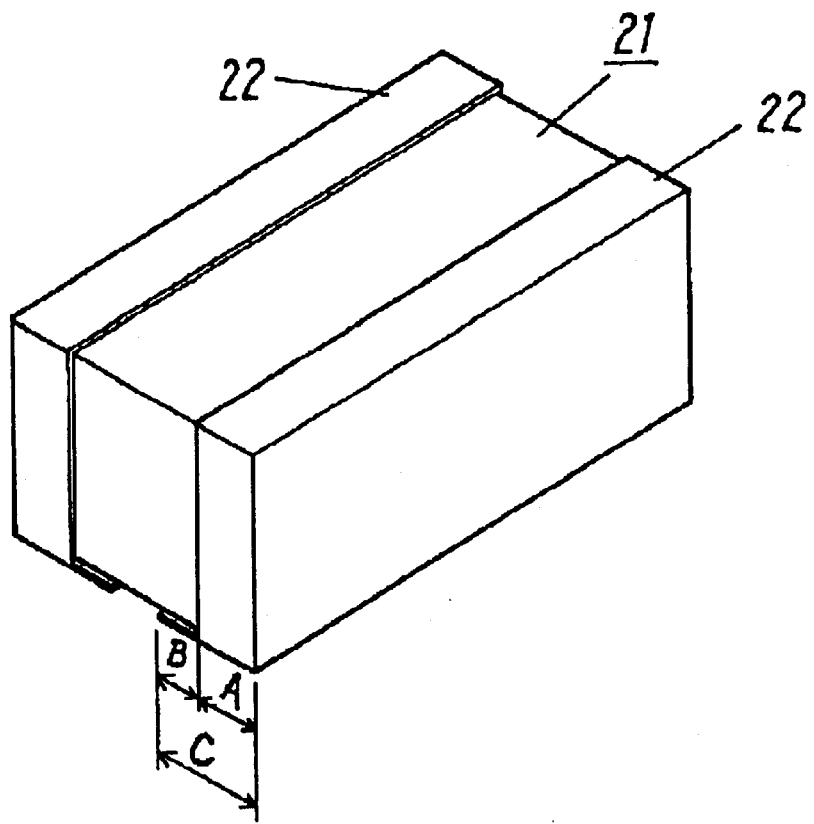
FIG. 9 is a perspective view of a solid electrolytic capacitor according to Embodiment 3 of the invention.

FIG. 9 is a perspective view of a solid electrolytic capacitor according to Embodiment 3 of the present invention. This embodiment is generally the same as either of the above embodiments, except as otherwise described below. The solid electrolytic capacitor 21 has external electrodes 22 opposite to each other on respective long sides L. Each of the external electrodes 22 has an extension portion extended toward each other on a mounting side (the bottom in FIG. 9) of the capacitor 21 at which the capacitor 21 is to be mounted to a printed circuit board, and is enlarged at the extension portion.

More specifically, the width of each external electrode 22 on the mounting side of the capacitor 21 is increased to a width C which is a sum of widths A and B, as shown in FIG. 9. Since the lower area of the external electrodes 22 is increased, the distance between the external electrodes 22 become shorter, thus having an ESL further reduced. As apparent from FIG. 20, the solid electrolytic capacitor of Embodiment 3 has the ESL stabilized at less than 2.25 nH, which is much lower than that of the conventional capacitor.

(Embodiment 4)

Figure 10:
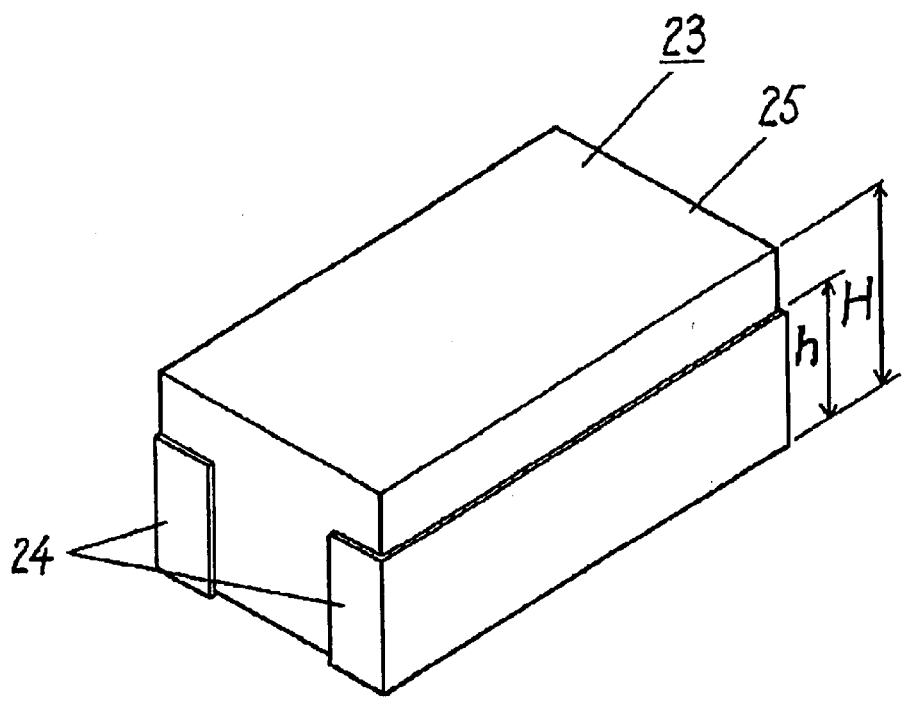
FIG. 10 is a perspective view of a solid electrolytic capacitor according to Embodiment 4 of the invention.

FIG. 10 is a perspective view of a solid electrolytic capacitor 23 according to Embodiment 4 of the present invention. This embodiment is generally the same as any of the above embodiments except as otherwise described below. The solid electrolytic capacitor 23 includes external electrodes 24 opposite to each other on respective long sides. The height of the external electrodes 24 measured from a mounting side (the bottom in FIG. 10) of the capacitor at which the capacitor is to be mounted to a printed circuit board (not shown) is lower than the height of an insulating resin 25 (like resin 9 of FIG. 2) in which capacitor elements (like elements 3 of FIG. 2) are encased.

More specifically, the height h of the external electrodes 24 is lower than the height H of the insulating resin 25, as shown in FIG. 10. This arrangement prevents the solid electrolytic capacitor 23 from being short-circuited between one or both of the external electrodes 24 and any other electronic components on the side (the top in FIG. 10) opposite the mounting side when the capacitor 23 is mounted on the printed circuit board.

(Embodiment 5)

Figure 11:
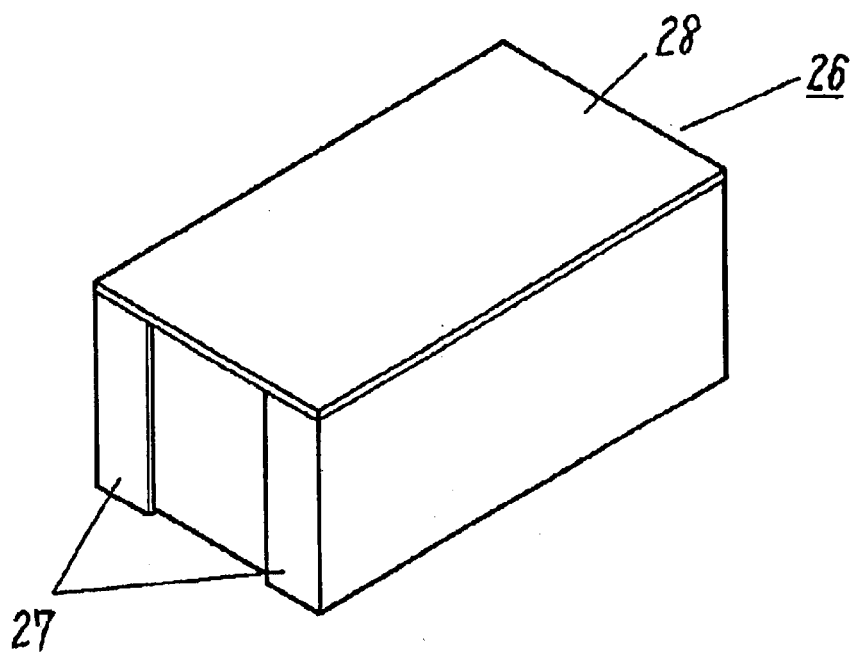
FIG. 11 is a perspective view of a solid electrolytic capacitor according to Embodiment 5 of the invention.

FIG. 11 is a perspective view of a solid electrolytic capacitor 26 according to Embodiment 5 of the present invention. This embodiment is generally the same as any of the above-described embodiments except as otherwise described below. The solid electrolytic capacitor 26 includes external electrodes 27 opposite to each other on respective long sides. For insulating the external electrodes 27 on the side (the top in FIG. 11) opposite to a mounting side (the bottom in FIG. 11), an insulating sheet 28 is provided.

Similar to the capacitor 23 of Embodiment 4, the solid electrolytic capacitor 26 of Embodiment 5 is prevented from being short-circuited between one or both of the external electrodes 27 and any other electronic components on the side (top side in FIG. 11) opposite to the mounting side when the capacitor is mounted on a printed circuit board.

(Embodiment 6)

Figure 12A:
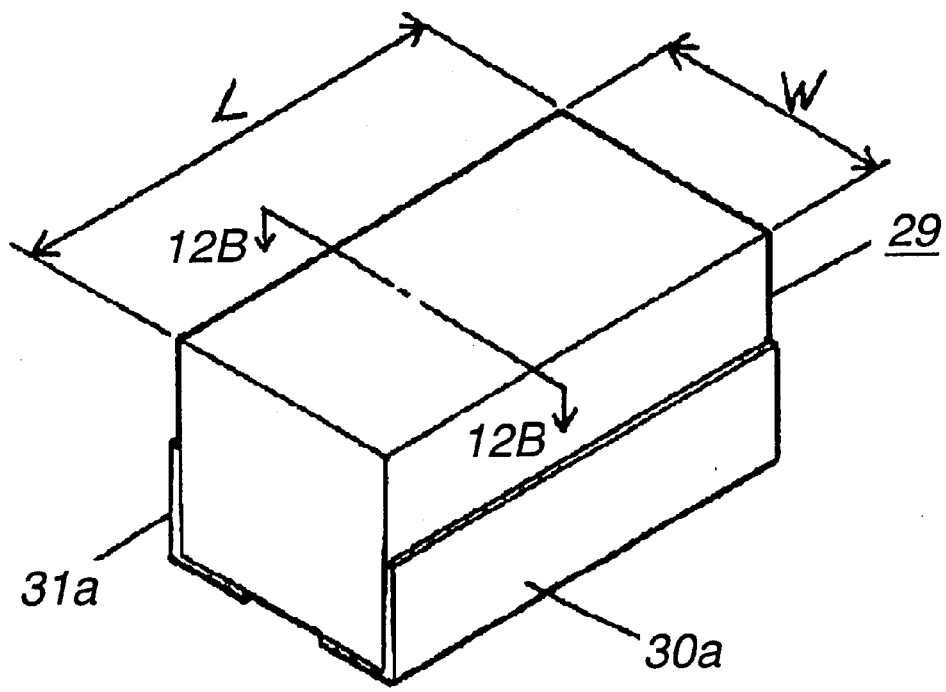
FIG. 12A is a perspective view of a solid electrolytic capacitor according to Embodiment 6 of the invention.
Figure 12B:
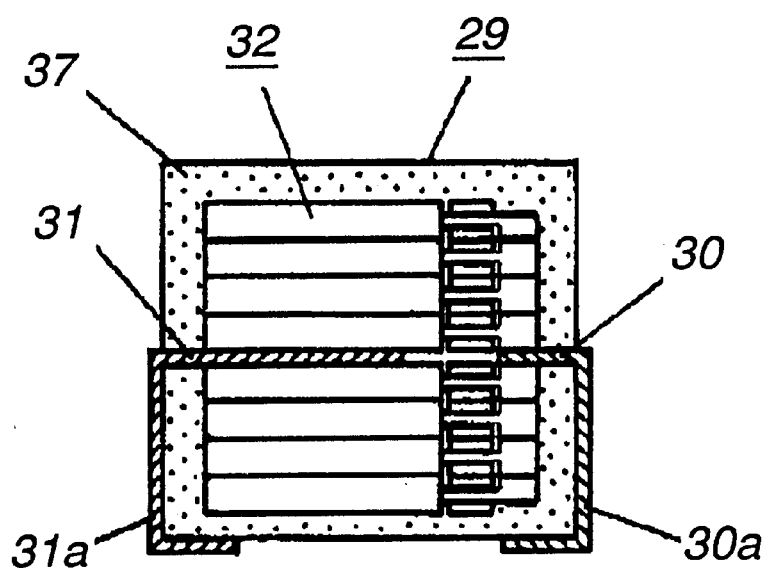
FIG. 12B is a cross sectional view of the solid electrolytic capacitor at a line 12B—12B of FIG. 12A.
Figure 13:
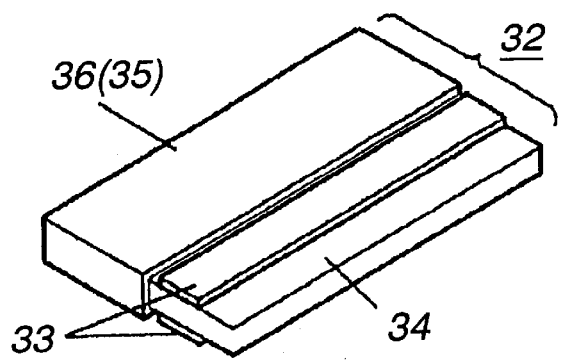
FIG. 13 is a perspective view of a capacitor element in the solid electrolytic capacitor according to Embodiment 6.

FIG. 12A is a perspective view of a solid electrolytic capacitor 29 according to Embodiment 6 of the present invention. FIG. 12B is a cross sectional view of the capacitor 29 at a line 12B—12B of FIG. 12A. FIG. 13 is a perspective view of a capacitor element 32 of the solid electrolytic capacitor 29.

As shown in FIG. 12A, the solid electrolytic capacitor 29 includes a positive electrode terminal 30a and a negative electrode terminal 31a integral with a positive electrode lead terminal 30 and a negative electrode lead terminal 31, respectively. Since the solid electrolytic capacitor 29 has a rectangular shape defined by a long side L and a short side W, the positive electrode terminal 30a and the negative electrode terminal 31a are located on respective long sides L of the solid electrolytic capacitor 29 so as to face each other. Accordingly, the distance between the positive electrode terminal 30a and the negative electrode terminal 31a is shorter than the long side L.

The capacitor element 32 is shown in FIG. 13. In FIG. 13, an anode body is made of valve metal foil, such as aluminum, and separated at an insulating resist 33 into a positive portion 34 and a negative portion 35. The negative portion 35 is then coated with a dielectric oxide layer and a solid electrolyte layer (not shown). The negative portion 35 is then coated with a carbon layer or a silver paste layer that forms a negative electrode layer 36, thus providing a capacitor element 32.

The solid electrolyte layer is made of electrically conductive polymer having a large electrical conductivity, thus reducing an ESR.

As shown in FIG. 12B, and as mentioned above, the positive electrode lead terminal 30 and the negative electrode lead terminal 31 are arranged to be integral with the positive electrode terminal 30a and the negative electrode terminal 31a, respectively. In particular, FIG. 12B shows eight of the capacitor elements 32 stacked. However, the number of the capacitor elements 32 can be other than eight. The positive portion 34 of each capacitor element is electrically connected to the positive electrode lead terminal 30, while the negative layer 36 of the element is electrically connected to the negative electrode lead terminal 31. Both sides of the negative electrode lead terminal 31 can be coupled to the negative electrode layer 36 of the capacitor element 32 with an electrically conductive adhesive. The positive electrode lead terminal 30 can be coupled to the positive portion of the capacitor element 32 by welding. The lead terminals may be coupled to the element 32 by other appropriate methods. They are then encapsulated in an insulating resin 37 with the positive electrode lead terminal 30 and the negative electrode lead terminal 31 exposed partially to the outside of the resin 37. Also, the portions of the positive electrode lead terminal 30 and the negative electrode lead terminal 31 extending outward from the insulating resin 37 are bent downward and then are folded across the bottom of the insulating resin 37 as shown in FIG. 12B. Thus, the positive electrode terminal 30a and negative electrode terminal 31a are provided to enable the solid electrolytic capacitor 29 of a rectangular shape to be surface-mounted.

In the solid electrolytic capacitor 29 of Embodiment 6, the distance between the positive electrode terminal 30a and the negative electrode terminal 31a is shorter than the long side L, hence significantly reducing an ESL. More particularly, the solid electrolytic capacitor 29 has both reduced ESR and ESL, while having small overall dimensions and a large capacitance. As apparent from FIG. 20, the solid electrolytic capacitor 29 has the ESL stabilized around 2.40 nH, which is much smaller than that of the conventional capacitor.

The anode body of the capacitor element 32 of Embodiment 6 is made of a valve metal foil having a rough surface. The valve metal foil of the anode body may be coated with a baked layer of valve metal powder.

(Embodiment 7)

A solid electrolytic capacitor 38 according to Embodiment 7 of the present invention is different than the capacitor 29 of Embodiment 6 with respect to the shape of the positive and negative electrode lead terminals. Other components of Embodiment 7 are identical to those of Embodiment 6 and are thus not further described, and like components are denoted by like numerals.

Figure 14A:
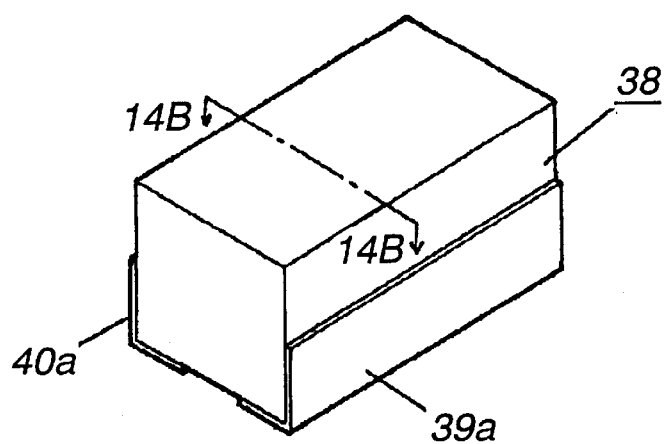
FIG. 14A is a perspective view of a solid electrolytic capacitor according to Embodiment 7 of the invention.
Figure 14B:
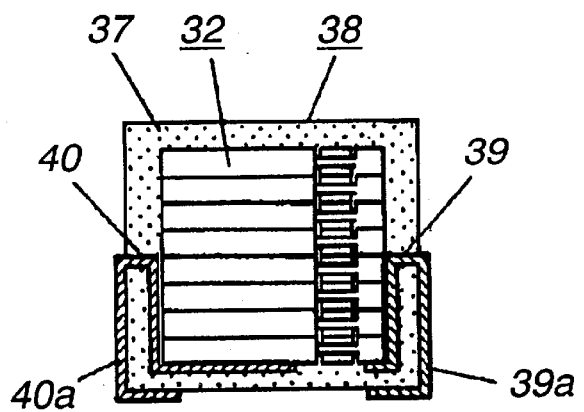
FIG. 14B is a cross sectional view of the solid electrolytic capacitor at a line 14B—14B of FIG. 14A.

FIG. 14A is a perspective view of the solid electrolytic capacitor 38 of Embodiment 7. FIG. 14B is a cross sectional view of the capacitor 38 at a line 14B—14B of FIG. 14A. A positive electrode lead terminal 39 is arranged to be integral with a positive electrode terminal 39a, and a negative electrode lead terminal 40 is arranged to be integral with a negative electrode terminal 40a. FIG. 14B shows eight capacitor elements 32 stacked and coupled on the positive electrode lead terminal 39 and the negative electrode lead terminal 40 in the same manner as the lead terminals 30 and 31 of embodiment 6. However, the number of the capacitor elements 32 can be other than eight. A positive portion of each capacitor element 32 is electrically connected to the positive electrode lead terminal 39, while a negative portion of each capacitor element 32 is electrically connected to the negative electrode lead terminal 40. They are then encapsulated in an insulating resin 37 with the positive electrode lead terminal 39 and the negative electrode lead terminal 40 exposed partially to the outside, thus constituting the external electrodes 39a, 40a. Also, the external positive electrode 39a and the external negative electrode 40a extending outward from the insulating resin 37 are bent downward and then folded across the bottom of the insulating resin 37. The positive electrode terminal 39a and negative electrode terminal 40a thus enable the solid electrolytic capacitor 38 of a rectangular shape to be surface-mounted.

The solid electrolytic capacitor 38 of Embodiment 7, similarly to that of Embodiment 6, has significantly reduced ESR and ESL, while having a small overall size and a large capacitance. As apparent from FIG. 20, the solid electrolytic capacitor 38 has the ESL stabilized around 2.40 nH, which is much smaller than that of the conventional capacitor.

(Embodiment 8)

A solid electrolytic capacitor 41 according to Embodiment 8 of the present invention is different than the capacitor 29 of Embodiment 6 with respect to the shape of the positive and negative electrode lead terminals. Other components of Embodiment 8 are identical to those of Embodiment 6 and will not be further described, and like components are denoted by like numerals.

Figure 15A:
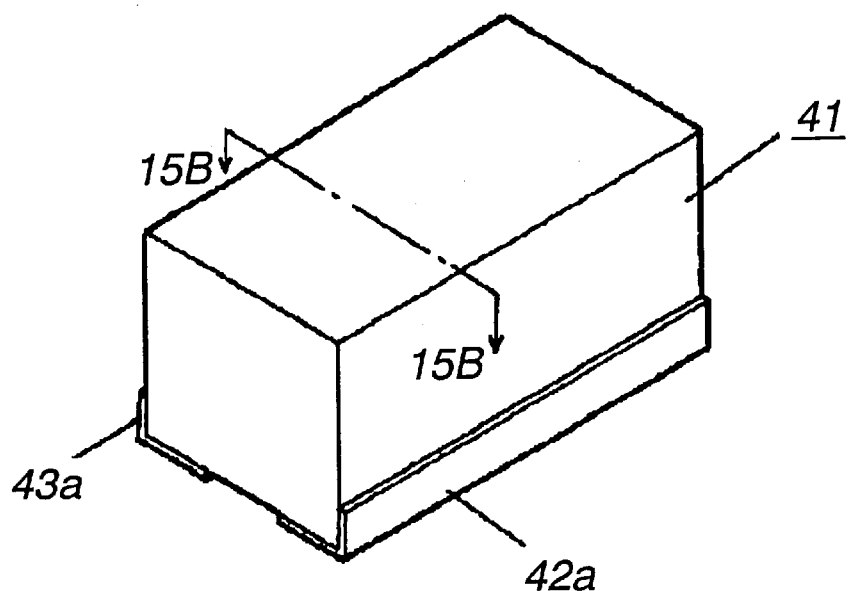
FIG. 15A is a perspective view of a solid electrolytic capacitor according to Embodiment 8 of the invention.
Figure 15B:
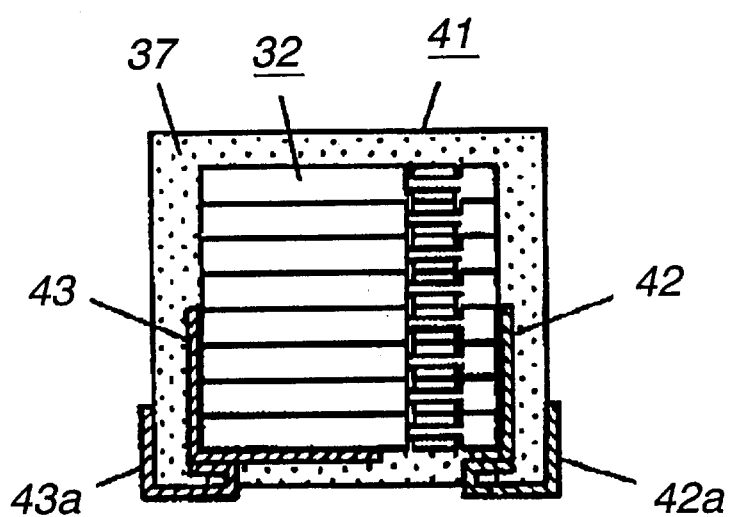
FIG. 15B is a cross sectional view of the solid electrolytic capacitor at a line 15B—15B of FIG. 15A.

FIG. 15A is a perspective view of the solid electrolytic capacitor 41 of Embodiment 8. FIG. 15B is a cross sectional view of the capacitor 41 at a line 15B—15B of FIG. 15A. The positive electrode lead terminal 42 is arranged in contact with an external positive electrode terminal 42a, while the negative electrode lead terminal 43 is arranged in contact with an external negative electrode terminal 43a. FIG. 15B shows eight capacitor elements 32 stacked and coupled on the positive electrode lead terminal 42 and the negative electrode lead terminal 43 in the same manner as the lead terminals of embodiment 6. However, the number of the capacitor elements 32 can be other than eight. A positive portion of each capacitor element 32 is electrically connected to the positive electrode lead terminal 42, while a negative portion of the element is electrically connected to the negative electrode lead terminal 43. The negative electrode lead terminal contacts the negative electrode layer of the outermost capacitor element through a large contacting area. The capacitor elements and the positive and negative electrode lead terminals are then encapsulated in an insulating resin 37. The external positive electrode 42a and the negative external electrode 43a are partially encapsulated, but also extend to the exterior of the insulating enclosure. The external positive electrode 42a and the external negative electrode 43a extending downwardly to the exterior of the insulating resin 37 and are bent across the bottom of the insulating resin 37 and extend upwardly as shown. The external positive electrode terminal 42a and the external negative electrode terminal 43a thus provided enable the solid electrolytic capacitor 41 of a rectangular shape to be surface-mounted. The positive and negative electrode lead terminals can be formed of conductive strips of copper or silver. At least one of the external terminals 42a and 43a may be formed integrally with the lead terminals 42 and 43, respectively, similarly to the external terminals of embodiments 6 and 7.

The solid electrolytic capacitor 41 of Embodiment 8, similarly to Embodiment 6, has significantly reduced ESR and ESL, while having a small overall size and a large capacitance. As apparent from FIG. 20, the solid electrolytic capacitor 41 has the ESL stabilized around 2.40 nH, which is much smaller than that of the conventional capacitor.

(Embodiment 9)

Figure 16:
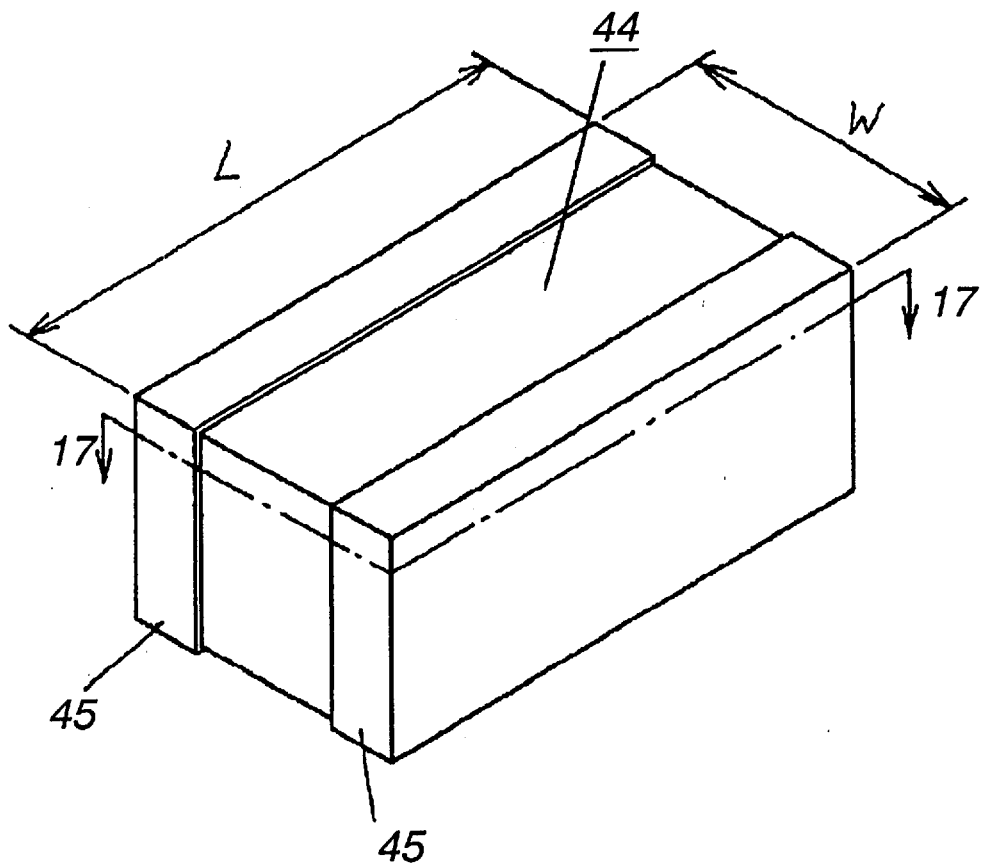
FIG. 16 is a perspective view of a solid electrolytic capacitor according to Embodiment 9 of the invention.
Figure 17:
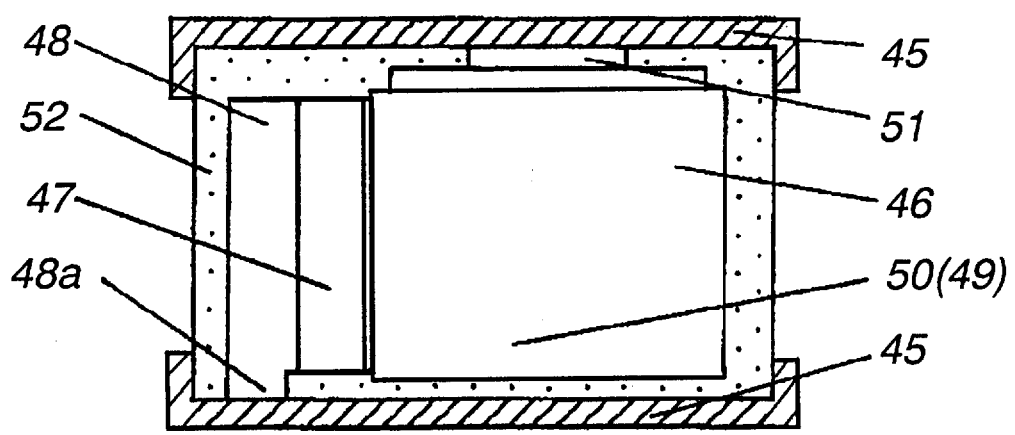
FIG. 17 is a cross sectional view of the solid electrolytic capacitor at a line 17—17 of FIG. 16.
Figure 18:
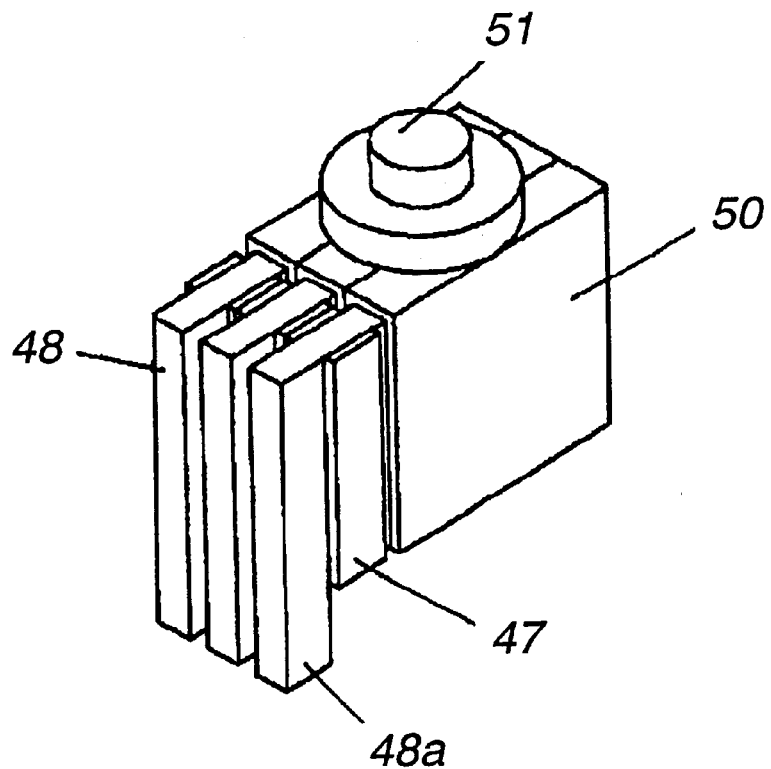
FIG. 18 is a perspective view of the solid electrolytic capacitor before a molding process according to Embodiment 9.
Figure 19:
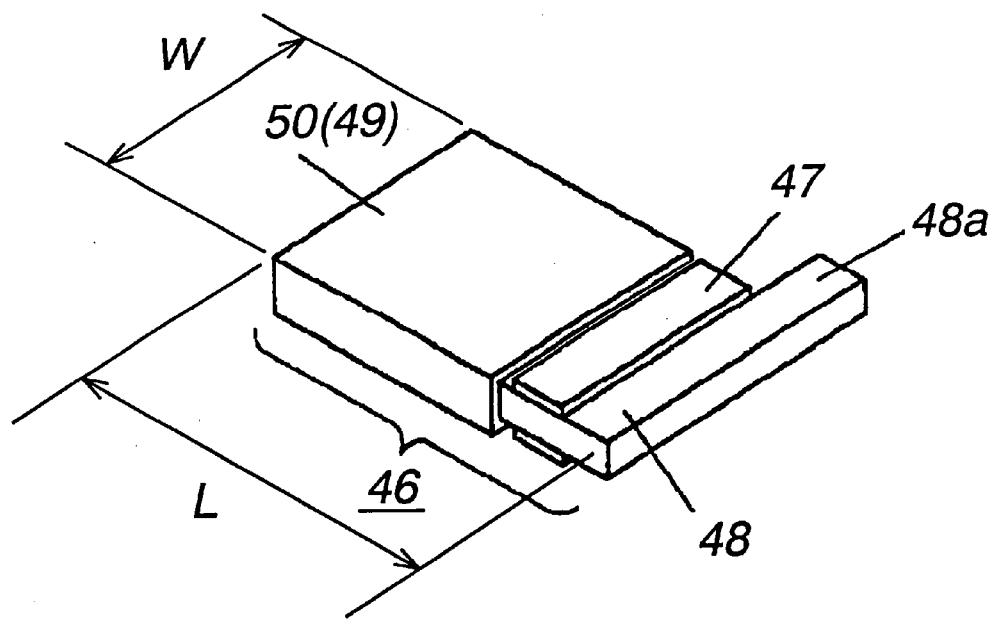
FIG. 19 is a perspective view of a capacitor element in the solid electrolytic capacitor according to Embodiment 9.

FIG. 16 is a perspective view of a solid electrolytic capacitor 44 according to Embodiment 9 of the present invention. FIG. 17 is a cross sectional view of the capacitor 44 at a line 17—17 of FIG. 16. FIG. 18 is a perspective view of the capacitor 44 before a molding process. FIG. 19 is a perspective view of a capacitor element 46 of the solid electrolytic capacitor 44. The solid electrolytic capacitor 44 has a rectangular shape defined by a long side L and a short side W and includes external electrodes 45 disposed on respective long sides L to face each other. The distance between the external electrodes 45 is shorter than the long side L.

FIG. 19 illustrates the capacitor element 46 of the solid electrolytic capacitor 44 shown in FIG. 16. The capacitor element 46 includes a substantially-rectangular anode body made of valve metal foil, such as aluminum, and a positive electrode connector 48a extending from a short side W. The anode body is separated at an insulating resist 47 in a direction of the long side L into a positive portion 48 and a negative portion 49. The negative portion 49 is coated with a dielectric oxide layer and a solid electrolyte layer (not shown). Then, a negative electrode layer 50 made of carbon or silver paste is provided, thus providing the capacitor element 46.

The solid electrolyte layer is made of conductive polymer having a large electric conductivity, thus reducing an ESR.

FIG. 18 shows three of the capacitor elements 46 stacked. However, the number of capacitor elements 46 can be other than three. The negative electrode layers 50 are electrically connected at the long side L to one another with a rivet 51 made of material having a small resistivity, such as silver. The capacitor elements 46 are then encapsulated in an insulating resin 52, as shown in FIG. 17. The external electrodes 45 are electrically connected to the rivet 51 and the positive electrode connectors 48a of the positive electrodes 48 of the capacitor elements 46, respectively. The external electrodes 45 are provided along respective long sides L to face each other, thus providing the solid electrolytic capacitor 44 of Embodiment 9.

The external electrodes 45 connected to the positive and negative portions of each capacitor element, respectively, thus function as external positive and negative electrodes.

The external electrodes may be implemented by plating layers. This implementation reduces both the ESR and an ESL.

In the solid electrolytic capacitor 44 of Embodiment 9, the distance between the external electrodes 45 largely affecting the ESL is shorter than the long side L. Since the redundant electrode leads of the lead terminals of the conventional capacitor are eliminated, the ESL can significantly be reduced. More specifically, the solid electrolytic capacitor of the embodiment has a small overall size and a large capacitance, while having significantly-reduced ESR and ESL. As apparent from FIG. 20, the solid electrolytic capacitor 44 of Embodiment 9 has the ESL stabilized around 2.50 nH, which is much smaller than that of the conventional capacitor.

The anode body of the capacitor element 46 of Embodiment 9 is implemented by a valve metal foil having a rough surface. The valve metal foil of the anode body is not so limited, and the foil may be coated with a baked layer of valve metal powder.

The rivet 51 electrically joining the negative electrode layers 50 to one of the external electrodes 45 has, as illustrated, a cylindrical shape having a step. The rivet 8 may have a sided column shape. It is however noted that air-tightness may unfavorably decline if the interface area between the rivet 51 and the external electrode 45 is excessively large.

Although FIGS. 16 and 17 show the arrangement of the exterior of the insulating enclosure (including the external electrodes and connections thereto) of Embodiment 9 as corresponding to that of Embodiment 1 (FIGS. 1 and 2), the arrangement can alternatively be that of any of Embodiments 3–8 (FIGS. 9–15B).

What is claimed is:

1. A capacitor comprising:
   at least one capacitor element comprising
   an anode body of a substantially rectangular shape so as to have first and second opposite short sides and first and second opposite long sides, said anode body being formed of valve metal and having positive and negative portions separated along a first direction parallel to said first and second short sides such that said negative portion is at said second long side,
   a dielectric oxide layer provided on said negative portion,
   a solid electrolyte layer provided on said dielectric oxide layer, and
   a negative electrode layer provided on said solid electrolyte layer;
   an insulating enclosure encapsulating said at least one capacitor element;
   an external positive electrode provided on an exterior of said insulating enclosure at said first long side of said at least one capacitor element and extending in a second direction parallel to said first and second long sides of said at least one capacitor element; and
   an external negative electrode provided on an exterior of said insulating enclosure at said second long side of said at least one capacitor element and extending in said second direction,
   wherein said external positive electrode is electrically connected to said positive portion of said at least one capacitor element, and
   wherein said external negative electrode is electrically connected to said negative electrode layer of said at least one capacitor element.

2. A capacitor according to claim 1, wherein said at least one capacitor element comprises a plurality of capacitor elements, and said capacitor elements are arranged in a stack.

3. A capacitor according to claim 1, further comprising:
   an electrically conductive member connecting said negative electrode layer of said at least one capacitor element to said external negative electrode,
   wherein said electrically conductive member is formed of silver or copper.

4. A capacitor according to claim 1, further comprising
   an electrically conductive member connecting said negative electrode layer of said at least one capacitor element to said external negative electrode,
   wherein said electrically conductive member comprises a column-shaped member.

5. A capacitor according to claim 4, wherein said electrically conductive member comprises a rivet.

6. A capacitor according to claim 1, further comprising
   an electrically conductive member connecting said negative electrode layer of said at least one capacitor element to said external negative electrode,
   wherein said electrically conductive member comprises an elongated strip member.

7. A capacitor according to claim 1, wherein each of said external positive electrode and said external negative electrode comprises a plated layer.

8. A capacitor according to claim 1,
   wherein said external positive electrode comprises:
   a first mounting side portion disposed on an exterior of said insulating enclosure and extending from said first long side of said at least one capacitor element in parallel to said first and second short sides for mounting to an external member; and
   a first opposite side portion disposed on an exterior of said insulating enclosure and being opposite to said first mounting side, and
   wherein said external negative electrode comprises:
   a second mounting side portion disposed on an exterior of said insulating enclosure and extending from said second long side of said at least one capacitor element in parallel to said first and second short sides for mounting to an external member; and a second opposite side portion disposed on an exterior of said insulating enclosure and being opposite to said second mounting side.

9. A capacitor according to claim 8, wherein said first opposite side portion of said external positive electrode has a smaller area than said first mounting side portion of said external positive electrode, and wherein said second opposite side portion of said external negative electrode has a smaller area than said second mounting side portion of said external negative electrode.

10. A capacitor according to claim 8, wherein said first opposite side portion of said external positive electrode is spaced apart by a first distance from said second opposite side portion of said external negative electrode, wherein said first mounting side portion of said external positive electrode is spaced apart by a second distance from said second mounting side portion of said external negative electrode, and wherein said first distance is longer than said second distance.

11. A capacitor according to claim 1, wherein said external positive electrode and said external negative electrode comprise mounting side portions disposed on an exterior of said insulating enclosure and extending from said first and second long sides of said at least one capacitor element for mounting to an external member, respectively, and wherein each of said external positive electrode and said external negative electrode has a height in a third direction perpendicular to said first and second directions that is less than a height of said insulating enclosure.

12. A capacitor according to claim 1, wherein said external positive electrode and said external negative electrode comprise mounting side portions disposed on an exterior of said insulating enclosure and extending from said first and second long sides of said at least one capacitor element for mounting to an external member, respectively, and wherein an insulating sheet is provided on an exterior of said insulating enclosure at a side thereof opposite said mounting side portions of said external positive and negative electrodes.

13. A capacitor according to claim 1, wherein said positive portion of said anode body of said at least one capacitor has a cutout portion therein.

14. A capacitor according to claim 1, wherein said at least one capacitor element comprises a plurality of capacitor elements, and said capacitor elements are arranged in a stack, and wherein said positive portion of said anode body of each of said capacitors has a cutout portion therein.

15. A capacitor according to claim 14, wherein the capacitor elements of each adjacently stacked pair of capacitor elements have said cutout portions at said first and second short sides, respectively.

16. A capacitor according to claim 1, wherein said anode body is made of a valve metal foil having a rough surface.

17. A capacitor according to claim 1, wherein said anode body comprises a valve metal foil, and a baked layer of valve metal powder on said valve metal foil.

18. A capacitor according to claim 1, wherein said valve metal contains at least one of aluminum, tantalum and niobium.

19. A capacitor according to claim 1, wherein said solid electrolyte layer is made of an electrically conductive polymer.

20. A capacitor comprising:

at least one capacitor element comprising an anode body of a substantially rectangular shape so as to have first and second opposite short sides and first and second opposite long sides, said anode body being formed of valve metal and having positive and negative portions separated along a first direction parallel to said first and second long sides such that said positive portion is at said first short side and such that said negative portion is at said second short side, said anode body including a positive electrode connector portion that extends from said positive portion beyond said first long side in a second direction parallel to said first and second short sides, a dielectric oxide layer provided on said negative portion, a solid electrolyte layer provided on said dielectric oxide layer, and a negative electrode layer provided on said solid electrolyte layer;

an insulating enclosure encapsulating said at least one capacitor element;

an external positive electrode provided on an exterior of said insulating enclosure at said first long side of said at least one capacitor element and extending in said first direction; and an external negative electrode provided on an exterior of said insulating enclosure at said second long side of said at least one capacitor element and extending in said first direction, wherein said external positive electrode is electrically connected to said positive portion of said at least one capacitor element, and wherein said external negative electrode is electrically connected to said negative electrode layer of said at least one capacitor element.

21. A capacitor according to claim 20, wherein said at least one capacitor element comprises a plurality of capacitor elements, and said capacitor elements are arranged in a stack.

22. A capacitor according to claim 20, further comprising an electrically conductive member connecting said negative electrode layer of said at least one capacitor element to said external negative electrode, wherein said electrically conductive member is formed of silver or copper.

23. A capacitor according to claim 20, further comprising an electrically conductive member connecting said negative electrode layer of said at least one capacitor element to said external negative electrode, wherein said electrically conductive member comprises a column-shaped member.

24. A capacitor according to claim 23, wherein said column-shaped member comprises a rivet.

25. A capacitor according to claim 20, further comprising an electrically conductive member connecting said negative electrode layer of said at least one capacitor element to said external negative electrode, wherein said electrically conductive member comprises an elongated strip member.

26. A capacitor according to claim 20, wherein each of said external positive electrode and said external negative electrode comprises a plated layer.

27. A capacitor according to claim 20,
wherein said external positive electrode comprises:
 a first mounting side portion disposed on an exterior of said insulating enclosure and extending from said first long side of said at least one capacitor element in parallel to said first and second short sides for mounting to an external member; and
 a first opposite side portion disposed on an exterior of said insulating enclosure and being opposite to said first mounting side, and
wherein said external negative electrode comprises:
 a second mounting side portion disposed on an exterior of said insulating enclosure and extending from said second long side of said at least one capacitor element in parallel to said first and second short sides for mounting to an external member; and
 a second opposite side portion disposed on an exterior of said insulating enclosure and being opposite to said second mounting side.

28. A capacitor according to claim 27,
wherein said first opposite side portion of said external negative electrode has a smaller area than said first mounting side portion of said external negative electrode, and
said second opposite side portion of said external positive electrode has a smaller area than said second mounting side portion of said external positive electrode.

29. A capacitor according to claim 27,
wherein said first opposite side portion of said external positive electrode is spaced apart by a first distance from said second opposite side portion of said external negative electrode,
wherein said first mounting side portion of said external positive electrode is spaced apart by a second distance from said second mounting side portion of said external negative electrode, and
wherein said first distance is longer than said second distance.

30. A capacitor according to claim 20,
wherein said external positive electrode and said external negative electrode comprise mounting side portions disposed on an exterior of said insulating enclosure and extending from said first and second long sides of said at least one capacitor element for mounting to an external member, respectively, and
wherein each of said external positive electrode and said external negative electrode has a height in a third direction perpendicular to said first and second directions that is less than a height of said insulating enclosure.

31. A capacitor according to claim 20,
wherein said external positive electrode and said external negative electrode comprise mounting side portions disposed on an exterior of said insulating enclosure and extending from said first and second long sides of said at least one capacitor element for mounting to an external member, respectively, and
wherein an insulating sheet is provided on an exterior of said insulating enclosure at a side thereof opposite said mounting side portions of said external positive and negative electrodes.

32. A capacitor according to claim 20, wherein said anode body is made of a valve metal foil having a rough surface.

33. A capacitor according to claim 20, wherein said anode body comprises a valve metal foil, and a baked layer of valve metal powder on said valve metal foil.

34. A capacitor according to claim 20, wherein said valve metal contains at least one of aluminum, tantalum and niobium.

35. A capacitor according to claim 20, wherein said solid electrolyte layer is made of an electrically conductive polymer.

36. A capacitor comprising:
at least one capacitor element comprising
 an anode body of a substantially rectangular shape so as to have first and second opposite short sides and first and second opposite long sides, said anode body being formed of valve metal and having positive and negative portions separated along a first direction parallel to said first and second short sides such that said positive portion is at said first long side and such that said negative portion is at said second long side,
 a dielectric oxide layer provided on said negative portion,
 a solid electrolyte layer provided on said dielectric oxide layer, and
 a negative electrode layer provided on said solid electrolyte layer;
an insulating enclosure encapsulating said at least one capacitor element;
an external positive electrode partially encapsulated by said insulating enclosure and extending out of said insulating enclosure to an exterior of said insulating enclosure so as to be disposed at said first long side of said at least one capacitor element; and
an external negative electrode partially encapsulated by said insulating enclosure and extending out of said insulating enclosure to an exterior of said insulating enclosure so as to be disposed at said second long side of said at least one capacitor element,
wherein said external positive electrode is electrically connected to said positive portion of said at least one capacitor element, and
wherein said external negative electrode is electrically connected to said negative electrode layer of said at least one capacitor element.

37. A capacitor according to claim 36, wherein said at least one capacitor element comprises a plurality of capacitor elements, and said capacitor elements are arranged in a stack.

38. A capacitor according to claim 36,
wherein said external positive electrode extends out of said insulating enclosure to an exterior of said insulating enclosure in a second direction generally opposite said first direction, and
wherein said external negative electrode extends out of said insulating enclosure to an exterior of said insulating enclosure generally in said first direction.

39. A capacitor according to claim 38, wherein both of said external positive electrode and said external negative electrode extend along the exterior of said insulating enclosure so as to respectively have terminal ends at a mounting side of said insulating enclosure that are spaced apart from one another.

40. A capacitor according to claim 38,
wherein said external positive electrode comprises an integral portion encapsulated by said insulating enclosure that constitutes a positive electrode lead terminal electrically connecting with said positive portion of each of said at least one capacitor element, and
wherein said external negative electrode comprises an integral portion encapsulated by said insulating enclosure that constitutes a negative electrode lead terminal electrically connecting with said negative electrode layer of each of said at least one capacitor element.

41. A capacitor according to claim 36,
wherein said external positive electrode extends out of said insulating enclosure to a mounting side of an exterior of said insulating enclosure in a direction generally perpendicular to said first and second short sides of said at least one capacitor element and said first and second long sides of said at least one capacitor element, and
wherein said external negative electrode extends out of said insulating enclosure to said mounting side of the exterior of said insulating enclosure in a direction generally perpendicular to said first and second short sides of said at least one capacitor element and said first and second long sides of said at least one capacitor element.

42. A capacitor according to claim 41, further comprising:
a positive electrode lead terminal encapsulated by said insulating enclosure and electrically connected with said positive portion of each of said at least one capacitor element, said positive electrode lead terminal being a separate element from said external positive electrode and being electrically connected thereto; and
a negative electrode lead terminal encapsulated by said insulating enclosure and electrically connected with said negative electrode layer of each of said at least one capacitor element, said negative electrode lead terminal being a separate element from said external negative electrode and being electrically connected thereto.

43. A capacitor according to claim 36, wherein said anode body is made of a valve metal foil having a rough surface.

44. A capacitor according to claim 36, wherein said anode body comprises a valve metal foil, and a baked layer of valve metal powder on said valve metal foil.

45. A capacitor according to claim 36, wherein said valve metal contains at least one of aluminum, tantalum and niobium.

46. A capacitor according to claim 36, wherein said solid electrolyte layer is made of an electrically conductive polymer.

47. A method of manufacturing a capacitor, comprising:
preparing a plurality of capacitor elements by
preparing a plurality of anode bodies each of a substantially rectangular shape so as to have first and second opposite short sides and first and second opposite long sides, said anode body being formed of valve metal foil, and said anode body having positive and negative portions separated along a first direction parallel to said first and second short sides such that said positive portion is at said first long side and such that said negative portion is at said second long side,
providing dielectric oxide layers on said negative portions,
providing solid electrolyte layers on said dielectric oxide layers, and
providing negative electrode layers on said solid electrolyte layers;
forming an assembly by stacking said capacitor elements on one another so that said first long sides of said capacitor elements are aligned with each other, said second long sides of said capacitor elements are aligned with each other, said first short sides of said capacitor elements are aligned with each other, and said second short sides of said capacitor elements are aligned with each other;
encapsulating said assembly in an insulating enclosure;
providing an external positive electrode on an exterior of said insulating enclosure at said first long sides of said capacitor elements and extending in a second direction parallel to said first and second long sides;
providing an external negative electrode on an exterior of said insulating enclosure at said second long sides of said capacitor elements and extending in said second direction;
electrically connecting said external positive electrode to said positive portions of said capacitor elements; and
electrically connecting said external negative electrode to said negative electrode layers of said capacitor elements.

48. A method according to claim 47, further comprising
after forming said assembly, providing an electrically conductive rivet, and electrically connecting said electrically conductive rivet to said negative electrode layer of each of said capacitor elements.

49. A method according to claim 47, wherein said anode body has a rough surface.

50. A method of manufacturing a capacitor, comprising:
preparing a plurality of capacitor elements by
preparing a plurality of anode bodies each of a substantially rectangular shape so as to have first and second opposite short sides and first and second opposite long sides, said anode body being formed of valve metal foil, and said anode body having positive and negative portions separated along a first direction parallel to said first and second short sides such that said positive portion is at said first long side and such that said negative portion is at said second long side,
providing dielectric oxide layers on said negative portions,
providing solid electrolyte layers on said dielectric oxide layers, and
providing negative electrode layers on said solid electrolyte layers;
forming an assembly by stacking said capacitor elements on one another so that said first long sides of said capacitor elements are aligned with each other, said second long sides of said capacitor elements are aligned with each other, said first short sides of said capacitor elements are aligned with each other, and said second short sides of said capacitor elements are aligned with each other;
electrically connecting said positive portions of said capacitor elements to a positive electrode terminal;
electrically connecting said negative electrode layers of said capacitor elements to a negative electrode terminal; and
encapsulating said assembly and at least parts of said positive and negative electrode terminals in an insulating enclosure.

51. A method according to claim 50, wherein said anode body has a rough surface.

* * * * *